United States Patent
Bartonek (10) Patent No.: US 6,872,945 B2
(45) Date of Patent: Mar. 29, 2005

(54) APPARATUS AND METHOD FOR DETECTION OF RAILROAD WHEEL AND BEARING TEMPERATURE

(75) Inventor: Mark Bartonek, Blue Springs, MO (US)

(73) Assignee: General Electric Company, Schenectady, NY (US)

( * ) Notice: Subject to any disclaimer, the term of this patent is extended or adjusted under 35 U.S.C. 154(b) by 215 days.

(21) Appl. No.: 10/291,332

(22) Filed: Nov. 8, 2002

(65) Prior Publication Data

US 2004/0089808 A1 May 13, 2004

(51) Int. Cl.⁷ .................................................. G01J 5/02
(52) U.S. Cl. .............. 250/339.04; 250/342; 246/169 A; 246/169 D
(58) Field of Search .......................... 250/339.04, 342, 250/332, 334, 349; 246/169 A, 169 D (56) References Cited

U.S. PATENT DOCUMENTS

| | | |
|---|---|---|
| 3,994,458 A | 11/1976 | Winters |
| 4,113,211 A | 9/1978 | Glazar |
| 4,313,583 A | 2/1982 | Bambara et al. |
| 4,316,175 A | 2/1982 | Korber et al. |
| 4,443,119 A | 4/1984 | Snider, Jr. et al. |
| 4,501,006 A | 2/1985 | Korenberg |
| 4,558,342 A | 12/1985 | Sclar |
| 4,659,043 A | 4/1987 | Gallagher |
| 4,722,612 A | 2/1988 | Junkert et al. |
| 4,805,854 A | 2/1989 | Howell |
| 4,812,826 A | 3/1989 | Kaufman et al. |
| 4,928,910 A | 5/1990 | Utterback et al. |
| 5,060,890 A | 10/1991 | Utterback et al. |
| 5,081,998 A | 1/1992 | Yelderman et al. |
| 5,100,243 A | 3/1992 | Grosskopf et al. |
| 5,149,025 A | 9/1992 | Utterback et al. |
| 5,331,311 A | 7/1994 | Doctor |
| 5,381,700 A | 1/1995 | Grosskopf, Jr. |
| 5,446,452 A | 8/1995 | Litton |
| 5,448,072 A | 9/1995 | Gallagher |
| 5,565,683 A | 10/1996 | Ando |
| 5,572,033 A | 11/1996 | Grant |
| 5,660,470 A | 8/1997 | Mench |
| 5,677,533 A | 10/1997 | Yaktine et al. |
| 5,789,735 A | 8/1998 | Gigioli, Jr. |
| 5,959,298 A | 9/1999 | Belcher et al. |
| 6,222,454 B1 * | 4/2001 | Harling et al. .............. 340/584 |
| 6,373,394 B1 | 4/2002 | Zhang |

* cited by examiner

Primary Examiner—David Porta
Assistant Examiner—Christine Sung
(74) Attorney, Agent, or Firm—Senniger Powers; Carl Rowold

(57) ABSTRACT

An apparatus and method is provided for detecting a temperature range or a temperature of a railroad train wheel or bearing wherein infrared radiation radiating from the wheel or bearing of a train traversing a railroad track is indicative of a temperature range of the wheel or bearing. The apparatus comprises a sensor for sensing infrared radiation radiating from the wheel or bearing within two or more infrared wavelength ranges. The sensor generates signals indicative of the sensed infrared radiation in each of the wavelength ranges. A processor determines a temperature range or a temperature of the wheel or bearing from the generated signals. The method detects a temperature range of a railroad train wheel or bearing wherein infrared radiation radiating from the wheel or bearing of a train traversing a railroad track is indicative of the temperature range of the wheel or bearing. The method includes sensing infrared radiation radiating from the wheel or bearing within two or more wavelength ranges of the infrared radiation. Signals are generated that are indicative of the sensed infrared radiation in each infrared wavelength range. A temperature range or a temperature of the wheel or bearing is determined from the generated signals.

35 Claims, 9 Drawing Sheets

APPARATUS AND METHOD FOR DETECTION OF RAILROAD WHEEL AND BEARING TEMPERATURE

BACKGROUND OF THE INVENTION

1. Field of the Invention

This invention relates generally to the detection of a temperature range or a temperature of a wheel or bearing of a railway vehicle. More specifically, the invention relates to collecting an infrared (IR) radiation wavelength spectrum radiating from the wheel or bearing of a train traversing a railroad track that is indicative of the temperature range or the temperature of the wheel or bearing.

2. Brief Description of the Prior Art

In order to protect against railroad car wheel or bearing failures, most railroads utilize heat detectors along their rights of way and in close proximity to their railroad tracks. Such detectors view, through infrared scanners, the bearing and wheel of a passing train. If an overheated wheel or bearing is detected, an alarm is triggered to alert the train operator that an overheated wheel or bearing has been detected.

The infrared scanner and associated circuits for detecting an overheated wheel or bearing are available commercially. Some systems utilize an infrared detector located in close proximity to a railroad track such that the detectors detects the presence of a hot wheel or bearing traversing the railway line. For example, a thermal detector is responsive to IR energy in the wavelength range of 6 to 14 microns. Such systems commonly use a lens and filter to collect the radiated infrared waves from the wheel or bearing and focus the collected infrared radiation within the predefined wavelength range directly onto an infrared detection device. The infrared detection device is only provided the range of wavelengths of infrared spectrum that is passed through the filter. The filter wavelength range is chosen to specify wavelengths that represent a hot wheel or hot bearing condition. The infrared detection device determines the presence of the wavelengths within the filtered wavelength range and produces an output signal indicative of the power or intensity of such infrared radiation within the predefined bandwidth range. In such prior art systems, an increase in the magnitude of the radiation within the wavelength range results in an increase in the voltage or current generated by the detector.

One such infrared detection device is a pyroelectric cell equipped with a lithium tantalate crystal. The pyroelectric detector produces an output voltage that is proportional to the infrared radiation that passes through the detector's lens and filter, e.g. the infrared radiation within the predefined wavelength range. The detector produces an alarm based on a predetermined voltage or current threshold. For example, one such threshold in the prior art is where the voltage output from the pyroelectric cell or an associated preamplifier is greater than or equal to 3.25 volts. When such a voltage threshold is exceeded, an alarm signal is generated.

In such systems, the detector is limited to identifying the intensity or power of the infrared radiation within the predefined wavelength range. The filter filters out infrared radiation not within the wavelength range of the filter so that the detection device is only provided a limited spectrum of infrared radiation as is necessary to determine the power of the infrared radiation within the wavelength range. While such a design provides an indication of a hot wheel or hot bearing that results in a voltage or current that exceeds the predetermined threshold voltage or current level, the prior art systems have several limitations in the application to railway systems that detect the heat of a traversing railway vehicle's wheel or bearing. The detection device is dependent on the detection of the power of the filtered infrared radiation as represented by the intensity of the received radiation. Therefore, in situations where this wavelength range is attenuated and/or filtered by external sources, the intensity of infrared radiation within the filtered bandwidth will be reduced. This results in an inaccurate detection of the hot wheel or bearing condition. For example, blowing snow, wind or rain or other weather conditions that exists between the detector and the railway vehicle can attenuate and thereby reduce the amount or intensity of the infrared radiation collected by the detector, thereby reducing the magnitude of infrared radiation within the wavelength range as detected by the detection device. In these cases, the sensed magnitude of radiation is less than the magnitude of radiation that is generated by the wheel or bearing and therefore a hot wheel or hot bearing may go undetected. When this occurs, there is potential for disaster as the undetected hot wheel or hot bearing may fail causing a potentially dangerous situation including a train derailment.

Another such external source which negatively impacts the operation of prior art detection systems is the sun. A "sun shot" occurs when a railway vehicle or car is open thereby allowing direct sunlight to be exposed to the detector. The sun is viewed in the detector's zone of detection and the collected infrared includes the direct sun light. In this situation, the filtered infrared radiation saturates the infrared detection device with considerable infrared radiation from the sun causing the detector to detect higher levels of heat thereby resulting in a false hot wheel or bearing alarm. In a similar situation, the required close proximity of the heat detection device to a high G-force environment (i.e., an environment with high mass times acceleration), which is common with railway systems, has been known to cause a piezoelectric effect in pyroelectric heat detection devices. The piezoelectric effect causes the device to produce a false heat signal or increased level of voltage output. In these cases, the false hot wheel or bearing alarm may result in an unnecessary and unscheduled stop of the train to investigate and perform maintenance. False stops are both time-consuming and costly as they may also cause substantial disruption in train schedules.

As such, there is a need for a hot wheel or hot bearing heat detection system that can accurately detect a temperature range or a temperature of the detected wheel or bearing in the harsh environment of the railway system. Such an improved system will not be susceptible to high G-forces associated with a traversing railway vehicle. An improved system will also accurately detect a temperature range or a temperature of the wheel or bearing when external factors such as snow or rain block a portion of the infrared radiation radiated by the wheel or bearing. Furthermore, an improved system will not be susceptible to inaccurate temperature measurements when the detector is exposed to high levels of direct sunlight.

BRIEF DESCRIPTION OF THE INVENTION

The invention provides an improved apparatus and method for detecting a temperature range or a temperature of wheel or bearing of railway vehicles traversing a railroad track.

In one form, the invention comprises an apparatus for detecting a temperature range of a railroad train wheel or bearing wherein infrared radiation radiating from the wheel or bearing of a train traversing a railroad track is indicative of the temperature range of the wheel or bearing. A sensor senses infrared radiation radiating from the wheel or bearing within two or more infrared wavelength ranges and generates signals indicative of the sensed infrared radiation in each of the wavelength ranges. A processor determines the temperature range of the wheel or bearing from the generated signals.

In another form, the invention includes a lens that collects infrared radiation radiating from the wheel or bearing of a train traversing a railroad track. The lens produces coherent radiation corresponding to the collected infrared radiation. A prism receives the coherent infrared radiation from the lens and generates a spectrum of infrared radiation along an axis. A sensor receives the spectrum and senses infrared radiation within two or more infrared wavelength ranges. The sensor generates signals indicative of the radiation within each of the infrared wavelength ranges.

In another form, the invention includes a lens that collects infrared radiation radiating from the wheel or bearing of a train traversing a railroad track and produces coherent infrared radiation corresponding to the collected radiation. A prism receives the coherent infrared radiation from the lens and generates a spectrum of infrared radiation along an axis. An array of sensing elements is aligned along the axis receiving the spectrum of infrared radiation. The array senses infrared radiation within two or more infrared wavelength ranges and generates corresponding signals indicative of infrared radiation within each of the two or more infrared wavelength ranges.

In yet another form, the invention comprises a lens to collect infrared radiation radiating from the wheel or bearing of a train traversing a railroad track. The lens produces coherent infrared radiation corresponding to the collected infrared radiation. A sensor receives the collected radiation and senses the received infrared radiation within two or more infrared wavelength ranges. The sensor generates signals indicative of the radiation within the wavelength ranges. A processor receives the generated signals indicative of the radiation within the infrared wavelength ranges. The processor determines a peak wavelength range of the sensed infrared radiation, the determined peak wavelength range being indicative of the temperature range of the wheel or bearing. The processor generates a signal that is indicative of a temperature range of the wheel or bearing.

In another form, the invention is an apparatus for detecting a temperature range of a railroad train wheel or bearing wherein infrared radiation radiating from the wheel or bearing of a train traversing a railroad track is indicative of a temperature range of the wheel or bearing. The apparatus includes means for collecting infrared radiation radiating from the wheel or bearing of a train traversing a railroad track. A sensing means for sensing infrared radiation of the collected infrared radiation within two or more infrared wavelength ranges. A determining means determines a peak wavelength range of the sensed infrared radiation. The determined peak wavelength range is indicative of the temperature range of the wheel or bearing. A generating means generates a signal indicative of the temperature range of wheel or bearing as represented by the determined peak wavelength range.

In yet another form, the invention is a method for detecting a temperature range of a railroad train wheel or bearing wherein infrared radiation radiating from the wheel or bearing of a train traversing a railroad track is indicative of a temperature range of the wheel or bearing. The method includes sensing infrared radiation radiating from the wheel or bearing within two or more wavelength ranges of the infrared radiation. Signals are generated that are indicative of the sensed infrared radiation in each infrared wavelength range. The temperature range of the wheel or bearing from the generated signals is determined.

In another form, the invention is a method of collecting infrared radiation radiating from the wheel or bearing of a train traversing a railroad track. The collected infrared radiation within two or more wavelength ranges is sensed. Each wavelength range sensed does not substantially overlap with any other wavelength range. A magnitude of the infrared radiation in each of the sensed wavelength ranges is determined. Signals are generated that are indicative of the determined magnitudes. The temperature range of the wheel or bearing is determined from the generated signals.

In yet another form, the invention is a method for detecting a temperature range of railroad train wheel or bearing wherein infrared radiation radiating from the wheel or bearing of a train traversing a railroad track is indicative of a temperature range of the wheel or bearing. The method comprises collecting infrared radiation radiating from the wheel or bearing of a train traversing a railroad track and generating two or more wavelength ranges of the collected infrared radiation. Each generated wavelength range does not substantially overlap with any other generated wavelength range. Infrared radiation within each of the infrared wavelength ranges is sensed and a corresponding signal indicative of the sensed infrared radiation for each wavelength range is generated. A peak wavelength range from the generated signals is determined wherein the peak wavelength range is indicative of the temperature range of the wheel or bearing. An alarm signal is generated when the determined peak wavelength range is less than or equal to a predefined wavelength.

In another form, the invention comprises an apparatus for detecting a temperature of a railroad train wheel or bearing wherein infrared radiation radiating from the wheel or bearing of a train traversing a railroad track is indicative of the temperature of the wheel or bearing. A sensor senses infrared radiation radiating from the wheel or bearing within two or more infrared wavelength ranges and generates signals indicative of the sensed infrared radiation in each of the wavelength ranges. A processor determines the temperature of the wheel or bearing from the generated signals.

The apparatus and method of the present invention has a number of advantages over the prior art. The present invention determines a temperature range or a temperature of the wheel or bearing and is not susceptible to variations in the amplitude, intensity or power of the detected infrared radiation. As such, the presence of snow, wind or rain that attenuates the emitted radiation does not necessarily impact the accurate measurement of the temperature. Furthermore, the presence of direct sunlight that increases the amount of detected infrared radiation does not create a false indication of the temperature. Additionally, a detector according to the invention is not susceptible to high G-forces. The apparatus and method of the invention may be deployed as a new unit or may be incorporated into a retrofit to existing hot wheel or hot bearing detection systems. The apparatus and method of the invention provide for improved detection of a temperature range or temperature of the traversing wheel or bearing thereby reducing the instances of false heat detection or non-detection of a hot wheel or hot bearing. As such the apparatus and method of the invention improves the operation of railway systems by reducing the likelihood of a train derailment or a costly unnecessary stop.

BRIEF DESCRIPTION OF THE DRAWINGS

Corresponding reference characters indicate corresponding parts throughout the drawings and specification.

DETAILED DESCRIPTION

Figure 1:
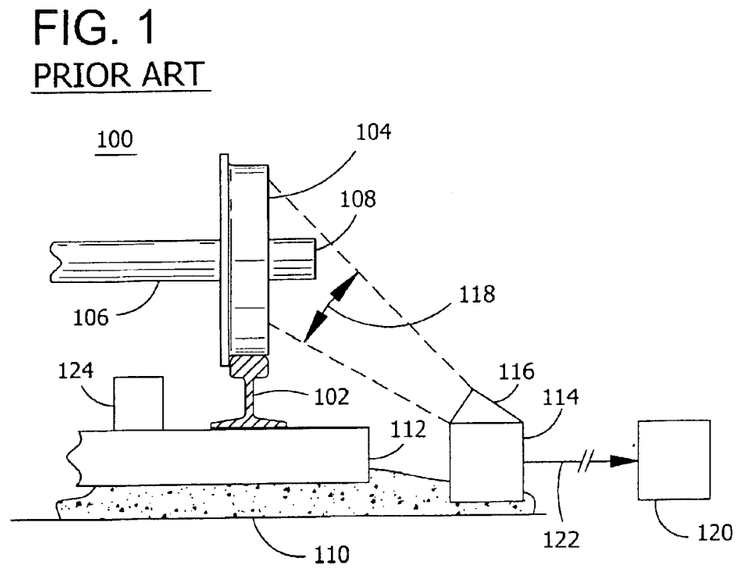
FIG. 1 is an illustration of a prior art hot wheel detection system for railway systems.

Referring to FIG. 1, a prior art hot wheel or bearing detection system 100 is located near a railroad rail 102. A railroad track is comprised of the railroad rail 102 and a crosstie 112 that is mounted on an earthen structure 110 such as gravel. Rail 102 is mounted on a plurality of crossties 112. A railway vehicle (not shown), includes one or more axles 106 which are connected to wheel 104 by bearing 108. As the railway vehicle moves, wheel 104 traverses rail 102. A hot wheel or hot bearing detector 114 is located in close proximity to rail 102 such as to enable detector 114 to detect a temperature range or a temperature of the wheel 104 or bearing 108 of a railway vehicle traversing rail 102. Detector 114 is configured with a scanner 116 that collects the heat generated by objects within the detection zone 118. Wheel sensor 124 is located inside of rail 102 to detect the presence of a railway vehicle or wheel 104 and axle 106 above the wheel sensor 124. Wheel sensor 124 provides an on and off switch function for the hot wheel or hot bearing detection system. In some embodiments, wheel sensors 124 are deployed in pairs wherein the first wheel sensor 124 detects a wheel 104 entering the detection zone and the second wheel sensor 124 detects the wheel 104 exiting the detection zone. Detector 114 provides an output signal 122 to a remote hot wheel or hot bearing detection system 120, which is often referred to as a hotbox detection system. Detector 114 detects infrared radiation within a predefined wavelength range. Output signal 122 has a voltage and current. The voltage of output signal 122 is proportional to the infrared radiation received by the detector 114. As such, as the amount of infrared radiation within the predefined wavelength range increases, the voltage produced by the detector 114 increases. The detector 114 produces an alarm when the voltage level is equal to or greater than a pre-establish threshold voltage level.

A plurality of detectors 114 are located along a railway track often spaced miles or kilometers apart and at the entry and exit of railway yards and other critical track locations, e.g. entering a tunnel, crossing a bridge, entering a city or town. A hot wheel or hot bearing detection system 120 is a centralized administration and maintenance system that collects the output from a plurality of detectors 114. The hot wheel or hot bearing detection system 120 provides reports and alarms to maintenance personnel and operators associated with the operation of the rail facility and/or the rail vehicle.

Figure 2:
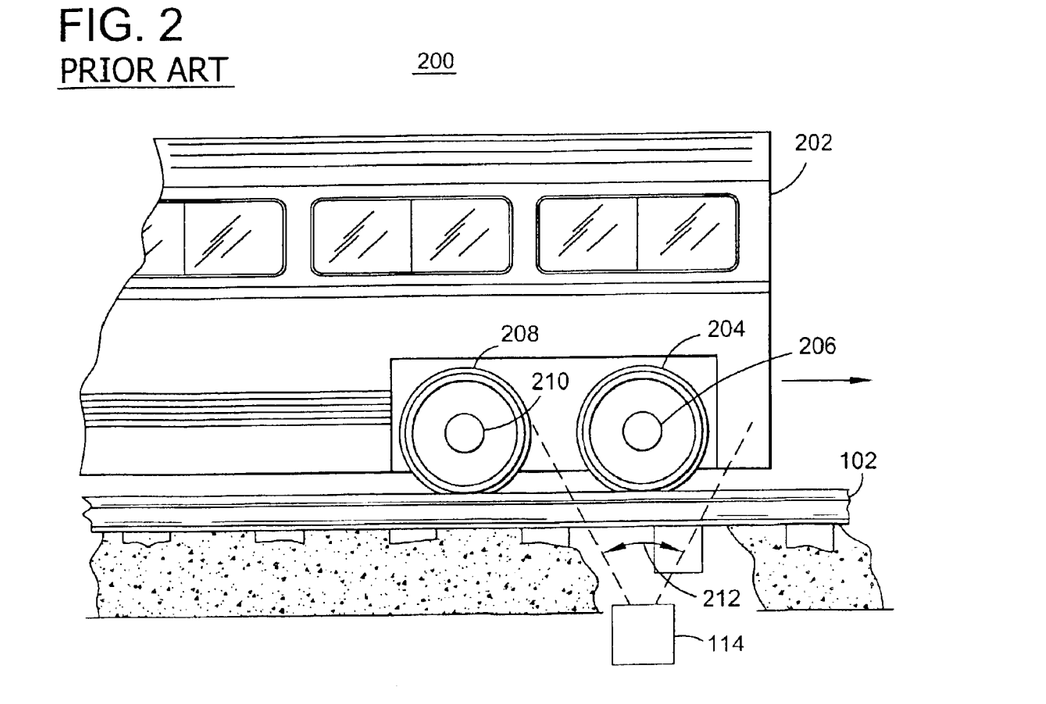
FIG. 2 is another illustration of a prior art hot wheel or hot bearing detection system for railway systems.

As shown in FIG. 2, a prior art railway vehicle 202 travels on rail 102 in the direction from left to right as indicated by the arrow. Rail vehicle 202 is equipped, in this illustration, with a first wheel 204, first bearing 206, a second wheel 208 and a second bearing 210. Detector 114 has a zone of detection 212. As rail vehicle 202 traverses rail 102 from left to right, first wheel 204 and first bearing 206 first enter the detection zone 212 of detector 114. As such, detector 114 first measures the temperature of the first wheel 204 and first bearing 206. As the train continues, the second wheel 208 and second bearing 210 enter the detection zone 212 and the detector 114 detects the temperature of the second wheel 208 and the second bearing 210. It should be noted that FIG. 1 and FIG. 2 illustrate only one placement and configuration of heat detector 114. It is well known in the prior art that such detectors have other arrangements. For example, the embodiment as shown in FIG. 1 and FIG. 2 are typically used to measure the temperature of the wheel 104, not the bearing 108, as the detection zones 118 and 212 are larger and do not focus on the bearing 108 which is located at the center of the wheel 104. Other known arrangements (not shown herein) for the detection of the temperature of wheel 104 or bearing 108 include the mounting of the detector 114 on a pole and mounting the detector 114 adjacent to rail 102. In the first arrangement, detector 114 is mounted on a pole or post such that the detector 114 is level or axially aligned with the wheel 104 or bearing 108. In this case the detection zone 118 is substantially smaller than for the detector 114 described above in FIG. 1. In another arrangement, a hot bearing detector 114 is mounted adjacent or in close proximity to rail 102. In this case, the scanner 114 has a narrow detection zone 118 that is either focused up directly under bearing 108 or at a 45-degree angle parallel to the rail.

Figure 3:
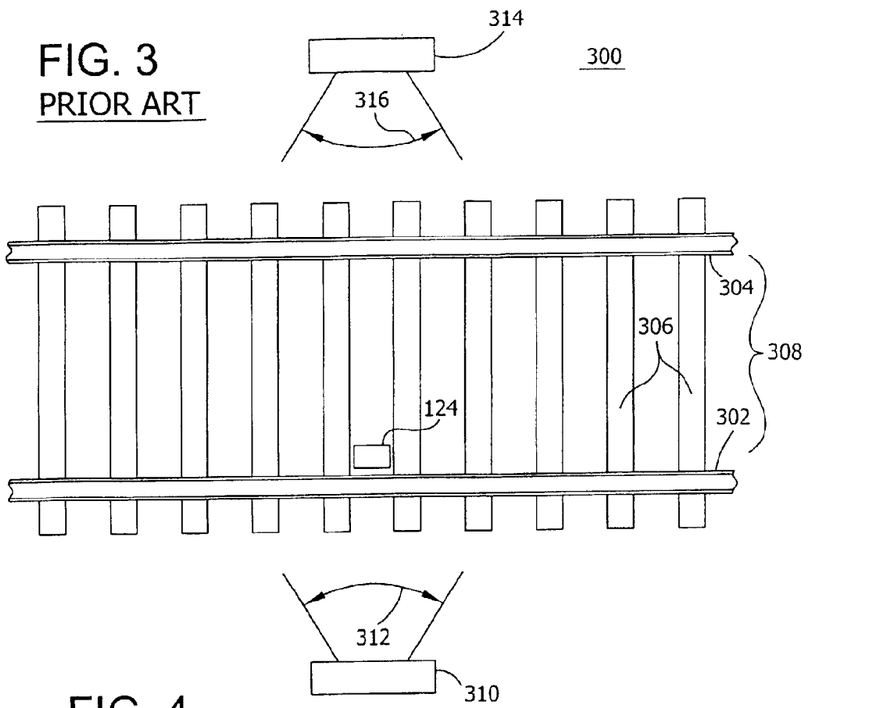
FIG. 3 is another illustration of a prior art hot wheel or hot bearing detection system.

As shown in FIG. 3, detectors 114 are typically deployed in pairs, one on each side of a railroad track. A railroad track 308 is comprised of a first rail 301, a second rail 304 and a plurality of crossties 306. The wheel sensor 124 is located between rails 302 and 304. A first detector 310 and a second detector 314 are in general alignment with the train sensor, each located external to rails 302 and 304, respectively. Detector 310 has a detection zone 312 and detector 314 has a detection zone of 316.

Figure 4:
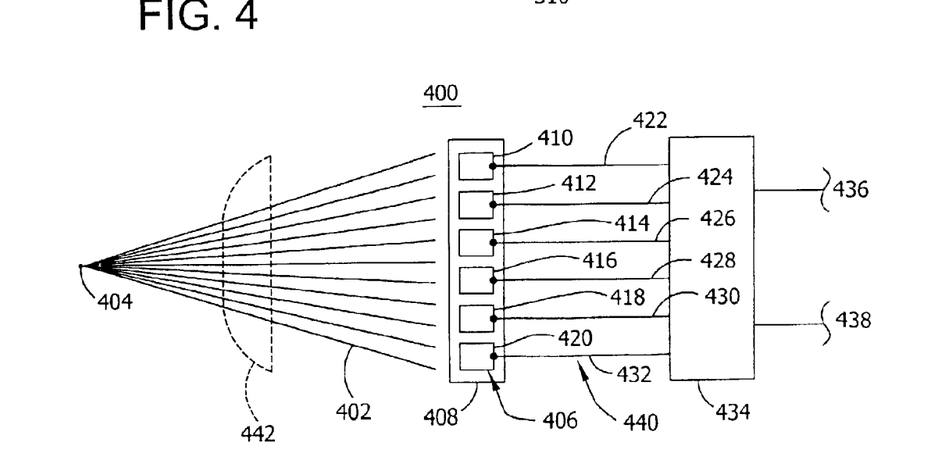
FIG. 4 is an illustration of a hot wheel or hot bearing temperature detector according to one embodiment of the invention.

Referring now to FIG. 4, in one embodiment of the invention a wavelength range heat detector apparatus 400 detects infrared (IR) radiation 402 emitted from a wheel 104 or a bearing 108. The wavelength range heat detector apparatus 400 receives the emitted infrared radiation 402 originating from a source or point of origin identified as 404, (e.g., a wheel 104 or bearing 108). In particular, an apparatus 400 includes an IR wavelength range detection array sensor 408 for receiving the infrared radiation either directly or as collected by an optional lens 442. The sensor 408 is an array with a plurality of IR detection elements 406. As shown in FIG. 4, one embodiment of the infrared wavelength range detection array sensor 408 has six detection elements 406, identified as elements 410 to 420. However, in other embodiments, the number of elements may be any number equal to or greater than two. Each element 410 to 420 provides an output signal 422 to 432, respectively, wherein each output signal 440 is indicative of the radiation detected by corresponding detection element 406.

Each element 406 is configured to detect a separate and unique wavelength range or frequency band of infrared radiation such that each does not substantially overlap with any wavelength range of any other element. For instance, while the infrared band of frequencies is generally defined as $1 \times 10^{11}$ to $3.75 \times 10^{14}$ Hz, which corresponds to wavelengths of 3,000 microns to 0.8 microns, the infrared band contemplated by one embodiment of the invention is the frequency band of $1 \times 10^{13}$ to $3.75 \times 10^{14}$ Hz, which corresponds to the wavelength range of 30 to 0.8 microns. Other ranges are possible depending of the range of temperatures to be detected. For instance in one alternative embodiment of the invention to detect a hot wheel or bearing of a railway vehicle, the range is from $2.14 \times 10^{13}$ to $3.75 \times 10^{14}$ Hz, which corresponds to the wavelength range of 14.0 to 0.8 microns. In another embodiment, the range is from $2.14 \times 10^{13}$ to $6.0 \times 10^{13}$ Hz, which corresponds to the wavelength range of 14.0 to 5.0 microns.

Similarly, in one embodiment of the invention, elements 406 are designed to detect unique discrete wavelength ranges, each having a separate and distinct wavelength range which does not substantially overlap with any wavelength range of any other element. For instance, each wavelength range detection element 406 may be designed to detect a wavelength range of 1.5 microns each or a frequency band of $2.0 \times 10^{14}$. For example, infrared wavelength range detection element 410 may detect the wavelengths within the wavelength range of 5.0 microns to 6.5 microns (i.e. $6.0 \times 10^{13}$ Hz to $4.6 \times 10^{13}$ Hz) and produce an output signal 422 indicative of the collected infrared radiation within this range. Infrared wavelength range detection element 412 may detect the wavelengths within the wavelength ranges of 6.5 microns to 8.0 microns and produce an output signal 424 indicative of the infrared radiation contained therein. Assuming substantially contiguous non-overlapping ranges, the total range of detection for array sensor 408 is the sum of the wavelength ranges for all detection elements 410 to 420 from 5 to 14 microns. It should be understood that each wavelength range detection element 406 may be designed to detect a very small wavelength range such that the wavelength range of each detection element detects temperature ranges that correspond to temperature measurements in whole or fractions of degrees as measured in Kelvin, Celsius or Fahrenheit. In other words, a temperature range as disclosed by this invention may be any range including a range that is indicative of a temperature corresponding to a degree or a fraction of a degree.

In one embodiment, a processor 434 receives as inputs the plurality of output signals 440 from the plurality of wavelength range detection elements 406 of the array sensor 408. The processor 434 senses each of the output signals 422 to 432 and determines the temperature range or a temperature of the traversing wheel 104 or bearing 108 by analyzing each of the output signals 422 to 432. As noted earlier, the invention contemplates two or more elements 406 and therefore the processor 434 analyzes two or more output signals 440 in order to determine the temperature range or the temperature of the wheel 104 or bearing 108. It should be understood that processor 434 may include a circuit designed to provide similar receiving, comparing and decision functions.

For instance, if element 410 is designed to detect wavelengths from 5.0 to 6.5 microns and element 412 is designed to detect wavelengths from 6.5 to 8.0 microns, output signal 422 would provide a signal having an amplitude indicative of the total IR radiation having wavelengths between 5.0 and 6.5 microns and output signal 424 would provide a signal having an amplitude indicative of the total IR radiation having wavelengths between 5.0 and 6.5 microns. Both elements 410 and 412 provide a signal indicative of the amplitude of the detected wavelengths within their wavelength range. The remaining elements 414 to 420 and their associated output signals 426 to 432 operate in a similar manner. As a result, processor 434 receives six inputs from the six output signals 422 to 432, each associated with a 1.5-micron wavelength range that is equivalent to a $2.0 \times 10^{14}$ frequency band. Processor 434, through a determination process (as discussed below), determines the temperature range or the temperature of the IR radiation as represented by the six output signals 422 to 432. This is an improvement over prior art devices that determine the presence of a hot wheel or hot bearing when the voltage or current of the output signal 122 created by the detection device 114 exceeds a predetermined threshold level and is only measuring the amplitude or power of the infrared radiation within a single filtered wavelength range.

As noted above, processor 434 determines the temperature range or the temperature through a determination process from two or more output signals 440 which are indicative of the infrared radiation detected by elements 406 of array 408. In one embodiment, processor 434 determines the peak wavelength range from the plurality of wavelength ranges of the emitted infrared radiation 402. The peak wavelength range is the wavelength range, e.g. 5.0 to 6.5 microns, 6.5 to 8.0 microns, 8.0 to 9.5 microns, etc., in which an amplitude peak resides. The amplitude peak is determined relative to the amplitude of the other wavelength ranges at a particular instant in time. As noted below, the peak is independent of time and distance of the detector 400 or the elements 406 from the point of origin 404.

Additionally, in another embodiment, the processor 434 may determine the temperature through a determination process of two or more output signals 440 by determining the wavelength of the amplitude peak. In this case, the determined peak wavelength is indicative of the temperature of the wheel 104 or bearing 108.

Figure 7:
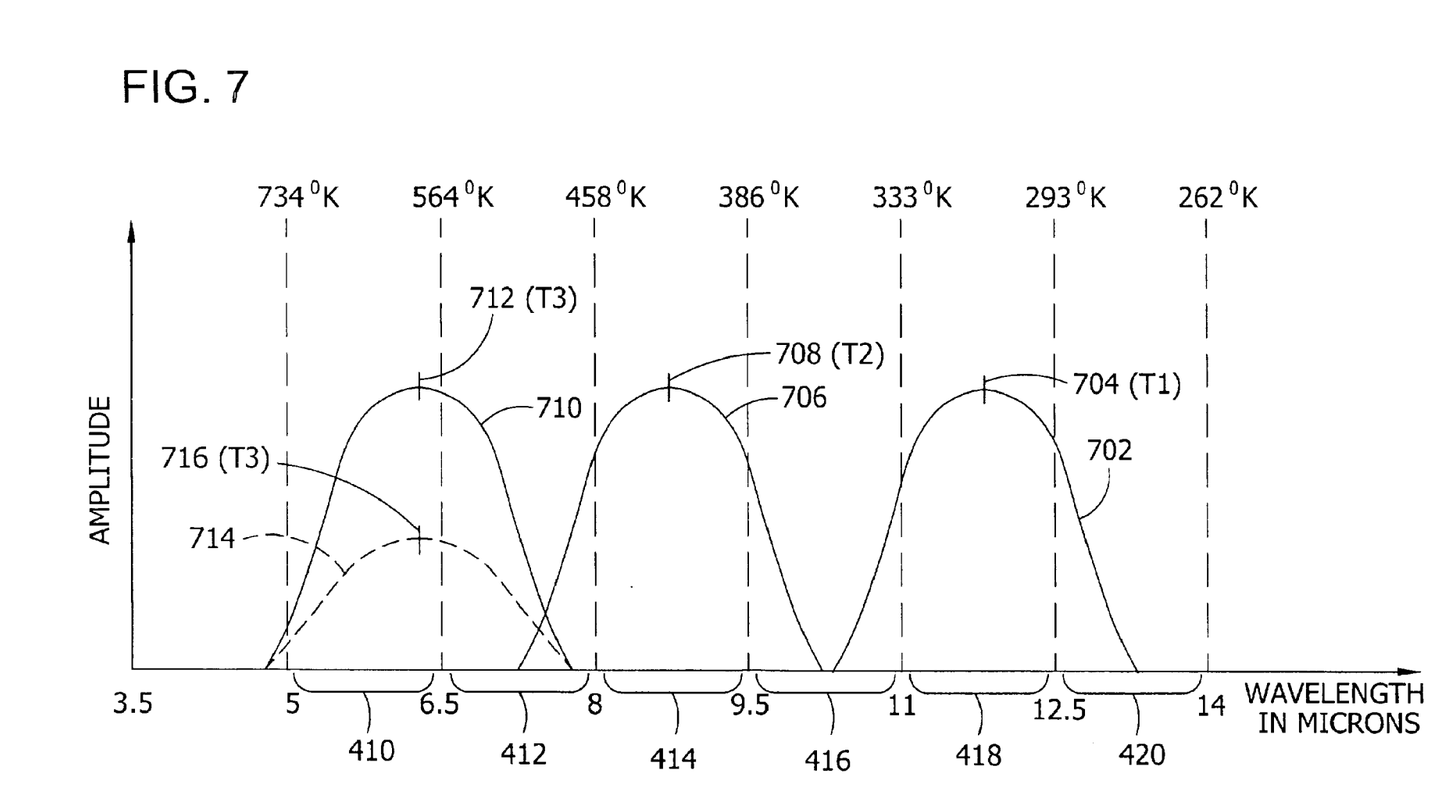
FIG. 7 is a graphical representation of four curves illustrating the amplitude of detected infrared radiation as a function of the wavelength.

Several examples of this determination of an amplitude peak are illustrated in FIG. 7. FIG. 7 illustrates IR radiation amplitude along the vertical axis as a function of wavelength along the horizontal axis. The horizontal scale for wavelength is shown in microns. In this example, each detection element is shown to have a 1.5-micron wavelength range. However, it should be understood that other embodiments may have other wavelength ranges. A detection element 410 is shown in FIG. 7 as detecting a wavelength range of 5.0 to 6.5 microns. Detection element 412 is shown as detecting a wavelength range of 6.5 to 8.0 microns. Detection elements 414, 416, 418 and 420 each have corresponding 1.5-micron wavelength ranges from 8.0 to 14.0 microns. The peak wavelength range is indicative of the temperature range of the wheel 104 or bearing 108. The peak wavelength range changes based on the temperature range of the wheel or bearing. For instance, when the peak wavelength range is W1, the temperature range of wheel or bearing is T1. If the peak wavelength range decreases from W1 to W2, the temperature range of the wheel or bearing increases to from T1 to T2. Thus, as the peak wavelength range of the IR radiation decreases, the temperature increases. The relationship is approximated by the following formula 1:

$$\text{temperature in Kelvin} = 3670/\text{wavelength in microns} \quad (1)$$

For example, if a peak wavelength is 12.2 microns, this indicates and corresponds to a temperature of 300 degrees Kevin. Similarly, if the peak wavelength is 10.48 microns or 9.17 microns, the temperatures are 350 degrees or 400 degrees Kelvin, respectively.

FIG. 7 illustrates four curves, each of which is shown on the single graph of FIG. 7 for illustrative purpose. Each curve illustrates the distribution of IR radiation over the IR wavelength spectrum of 5.0 to 14.0 microns for four different temperature measurements. Curve 702 illustrates the IR wavelength spectrum having a peak wavelength 704 within the range of from 11.0 to 12.5 microns indicating a temperature in the range of 293 to 333 degrees Kelvin. Similarly, curve 706 illustrates the IR wavelength spectrum having a peak wavelength 708 within the peak wavelength range from 8.0 to 9.5 microns indicating a temperature in the range of 386 to 458 degrees Kelvin. Curve 710 illustrates the IR wavelength spectrum having a peak wavelength 712 within the peak wavelength range from 5.0 to 6.5 microns including a temperature in the range of 564 to 734 degree Kelvin.

As noted above, in an alternative embodiment, where the processor 434 may determine the wavelength of the peak amplitude, the processor 434 may determine the temperature of the wheel 104 or bearing 108. For example, in FIG. 7 curve 706 has a peak amplitude at 708 that corresponds to a wavelength of 8.75 microns. Once the processor 434 determines that the peak is at 8.75 microns, the processor determines that the temperature of the wheel 104 or bearing 108 is 419.4 degrees Kelvin.

In some cases, the relative amplitude of the detected infrared radiation may vary by the location of the detector or by external factors that affect the amount of radiation detected by the detector 114. In either case, the amplitude of the received spectrum is reduced. This is illustrated in FIG. 7 by curve 714. Curve 714 illustrates the IR wavelength spectrum having a peak wavelength 716 within the peak wavelength range form 5.0 to 6.5 microns including a temperature in the range of 564 to 734 degree Kelvin. Curve 714, as compared to curve 710, has the same shape such that the peak IR wavelength 716 is the same peak IR wavelength as curve 710 at peak 712. However, the curve is significantly reduced in amplitude as a result of a attenuation of the IR radiation between the source 404 and the detector 602. Such a attenuation may be due to the presence of snow, ice, rain or wind. However, it is important to note that while the amplitude is significantly reduced, the detection of the peak wavelength range is not affected by the external factors and therefore the detected temperature range is consistent with a measurement that does not have the external factors present. This demonstrates one of the advantages of the invention over the prior art that is the ability to accurately detect the temperature range of the wheel 104 or bearing 108 in the presence of negative external factors and independent of the time at which the IR radiation is sensed and independent of the distance of the source of the IR radiation from the detector. Of course, it is noted that severe attenuation may render the waveform peak undetectable due to the limited sensitivity of the detectors.

Figure 8:
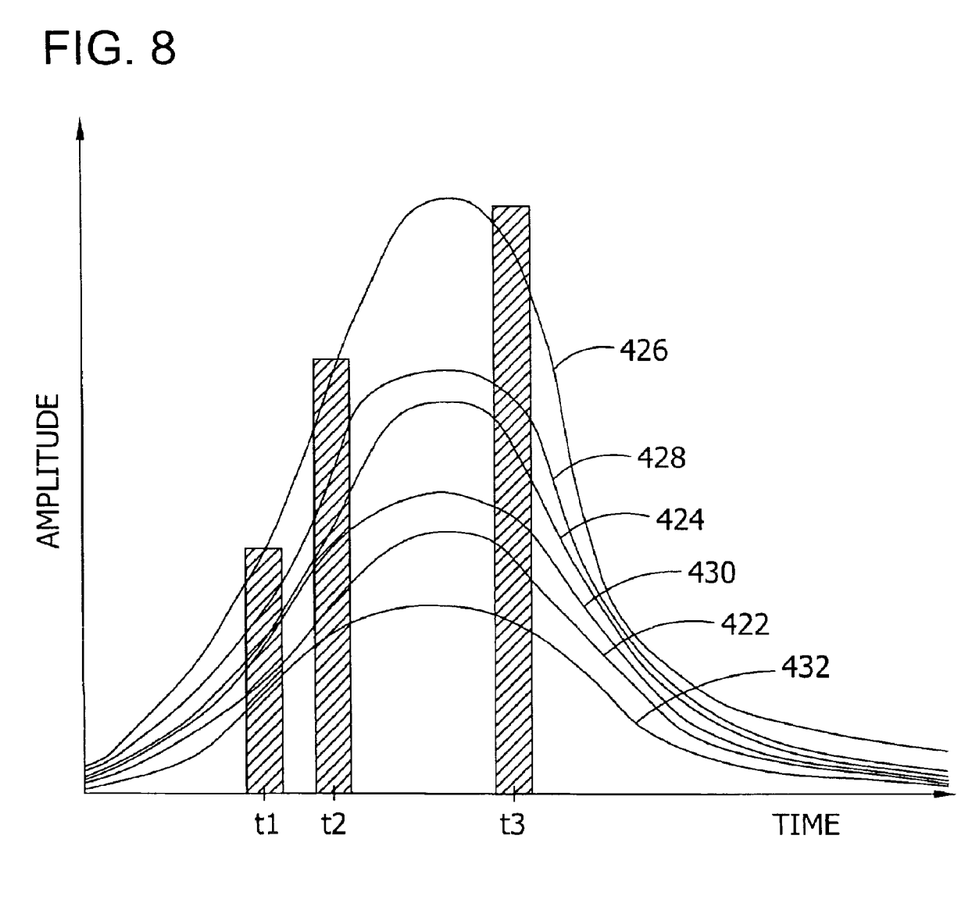
FIG. 8 is a graphical representation of the amplitude of six output signals indicative of the detected infrared radiation as a function of time according to one embodiment of the invention.

The determination of the peak may be illustrated as shown in FIG. 8. In FIG. 8, the vertical axis is a scale of amplitude and the horizontal axis is a time scale. FIG. 8 illustrates the amplitude of output signals 422 to 432 which are indicative of the IR radiation detected by elements 410 to 420 as a wheel 104 or bearing 108 passes through the zone of detection. Processor 424 receives the six output signals 422 to 432 for a particular time period. In this illustration, the amplitude of each of the six output signals is illustrated over the same period of time, such as a snapshot or single measurement period. In FIG. 8, the output signal 426 is shown to have the greatest amplitude relative to the other output signals for any period of time tn. Also shown are three specific periods of time t1, t2 and t3. For each period of time t1, t2, and t3, as with other possible periods of time, the output signal 426 is shown to have the highest amplitude relative to the other output signals during the same time period. As such, the peak wavelength range for this measured wheel 104 or bearing 108 is the wavelength range associated with output signal 426, which is within the wavelength range of element 414. In one embodiment, the processor 424 selects one period of time for determining the peak as indicated by the example of t1, t2 or t3. However, in other embodiments, processor 424 may select or sample more than one period of time and may apply a weighted average to the peak amplitude over time in order to determine the peak wavelength range and its corresponding temperature range. Furthermore, the processor 424 may determine the temperature of the wheel 104 or bearing 108 by other determination processes such as determining the wavelength of the peak amplitude, estimating the wavelength of the peak amplitude based on one or more determined amplitudes of the output signals 426, or by applying an averaging to the determined amplitudes.

In yet another embodiment, processor 434 compares the determined peak wavelength range to a predetermined threshold wavelength range or wavelength. If the determined peak wavelength range is less than the predetermined wavelength range or wavelength, processor 434 generates an alarm signal 438. For example, in one embodiment an alarm signal is generated if the peak wavelength range for a detected bearing 108 is below the range of 8.0 to 9.5 microns. In a similar manner, another embodiment determines discrete frequency bands of the emitted infrared radiation 402. A peak frequency band is determined from the frequency bands. The processor 434 compares the determined peak frequency band to a predefined frequency band. If the determined peak frequency band is greater than the predefined frequency band, processor 434 generates an alarm signal 438.

In yet another embodiment, processor 434 compares the determined temperature range or temperature to a predetermined threshold temperature range or temperature. If the determined temperature range or temperature is greater than the predetermined temperature range or temperature, processor 434 generates an alarm signal 438. For example, in one embodiment an alarm signal is generated if the determined temperature for a detected wheel 104 or bearing 108 is greater than 458 degrees Kelvin.

It should be understood that when comparing a determined range to a predetermined threshold range, whether it be wavelength, frequency or temperature based, the processor may be configured to compare the determined range to a predetermined threshold range to address situations where the determined range overlaps in whole or in part with the threshold range. For instance, if the low end of the determined wavelength range is less than the high end of the threshold wavelength range, the processor may be configured to either include or exclude this range from its determination process. If it includes it, the processor 434 would generate an alarm. If it excludes it, the processor would not processor an alarm.

In another embodiment, processor 434 generates a temperature signal 436 that is indicative of the temperature range of the wheel 104 or bearing 108. In this case, the output temperature signal 436 may be received as an input into another processor or may be received by a remote hot wheel or hot bearing detection system 120 or other administrative or maintenance system. In other embodiments, processor 434 may provide or generate other signals, messages, alarms, reports, etc. as necessary for the particular operation of a railroad heat detection, administration or maintenance system.

Figure 5:
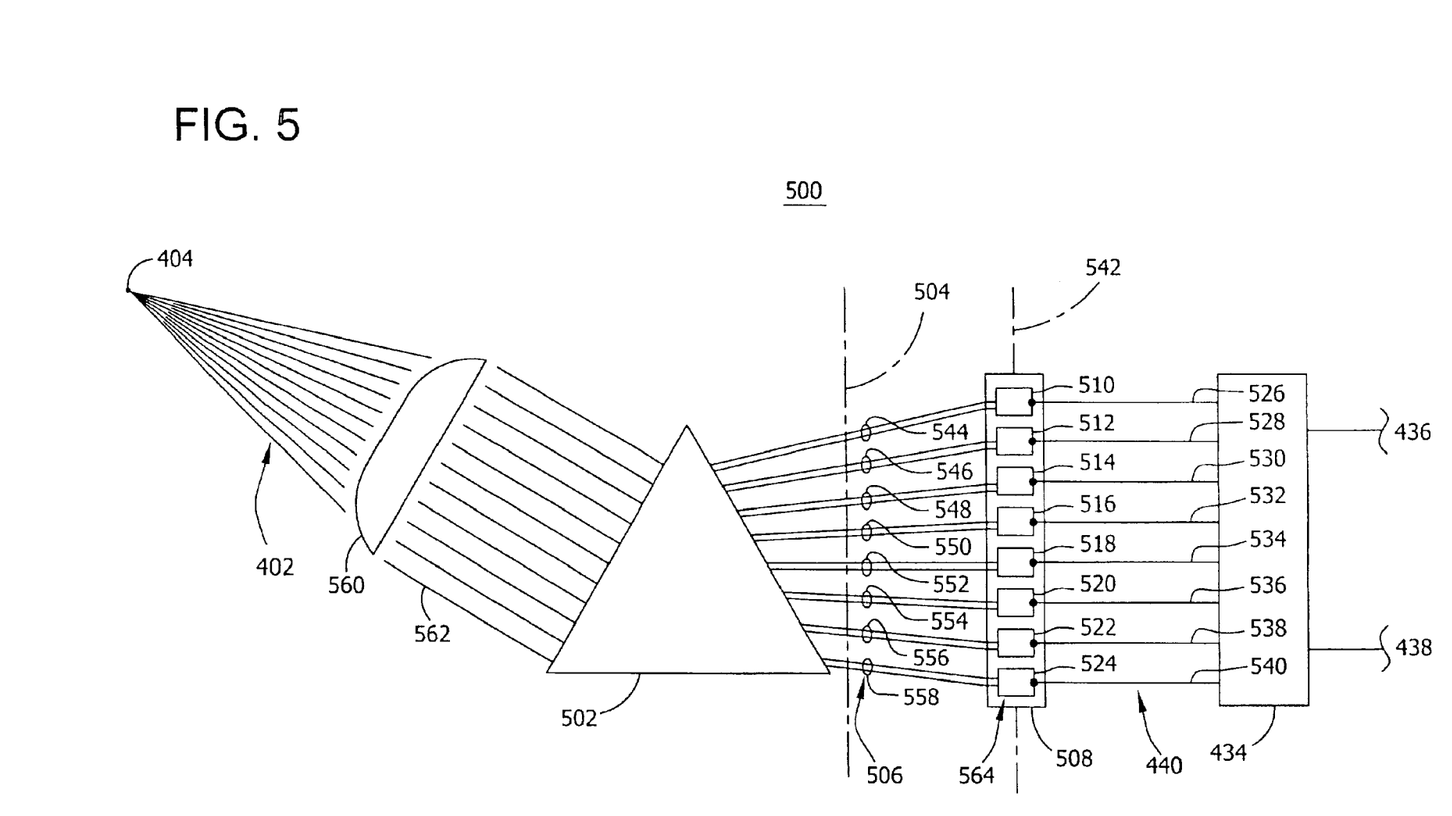
FIG. 5 is an illustration of a hot wheel or hot bearing temperature detection apparatus utilizing a prism according to one embodiment of the invention.

Now referring to FIG. 5, another embodiment of the hot wheel or hot bearing temperature detection apparatus with a prism 500 is illustrated. In this embodiment, emitted IR radiation 402 has a source 404. A lens 560 receives the emitted radiation 402 and produces a coherent IR radiation beam 562 corresponding thereto. A prism 502 is positioned to receive the coherent beam 562 from lens 560. The prism 502 deflects the beam into a continuous spectrum of wavelength ranges 506 along an axis 504. As shown as one embodiment in FIG. 5, eight wavelength ranges 506 are depicted as 544 to 558. However, the number of wavelength ranges may vary and be any number equal to or greater than two.

The hot wheel or hot bearing temperature detection apparatus with a prism shown as 500 further comprises an infrared detection array 508. IR detection array 508 has two or more wavelength detection elements 564. As shown in FIG. 5, infrared detection array 508 has eight array elements 564 which are identified as 510 to 524. Other embodiments may have fewer array elements 564 than the number of wavelength ranges 506. In one embodiment the prism 502 is the infrared prism which only transmits infrared radiation so that the transmitted wavelength ranges 506 would represent frequencies from $1 \times 10^{11}$ to $3.75 \times 10^{14}$ Hz or wavelengths of 3,000 microns to 0.8 microns. In another embodiment, the contemplated infrared range of the prism is the frequency band of $1 \times 10^{13}$ to $3.75 \times 10^{14}$ Hz, which corresponds to the wavelength range of 30 to 0.8 microns.

The array 508 has an axis 542 that is aligned with the axis 504 of the prism 502 and the axis of the spectrum of wavelengths produced by the prism 502. In other embodiments, the alignment of the axis 542 with the prism axis 504 may not be required. In such cases, one alignment consideration would be the alignment of the detection elements 510 to 524 such that the each element receives a different wavelength range.

Each of the IR detection elements 564 is essentially the same element and may detect a broadband of IR radiation. This is in contrast to the element of array 408, each of which detects a limited bandwidth range. Each IR detection element 564 is configured to generate an output signal 440, each of which is identified in FIG. 5 individually as 526 to 540. Each output signal 440 is indicative of the amplitude of the radiation within each associated IR wavelength range 506 as detected by the associated IR detection element 564.

The output signal 440 is input into processor 434. As discussed above with regard to FIG. 4, processor 434 receives as an input two or more output signals 440 from the plurality of wavelength range detection elements 564 of the IR array sensor 508. Processor 434 senses each of the output signals 440 and determines the temperature range of the traversing wheel 104 or bearing 108, as noted above.

Figure 6:
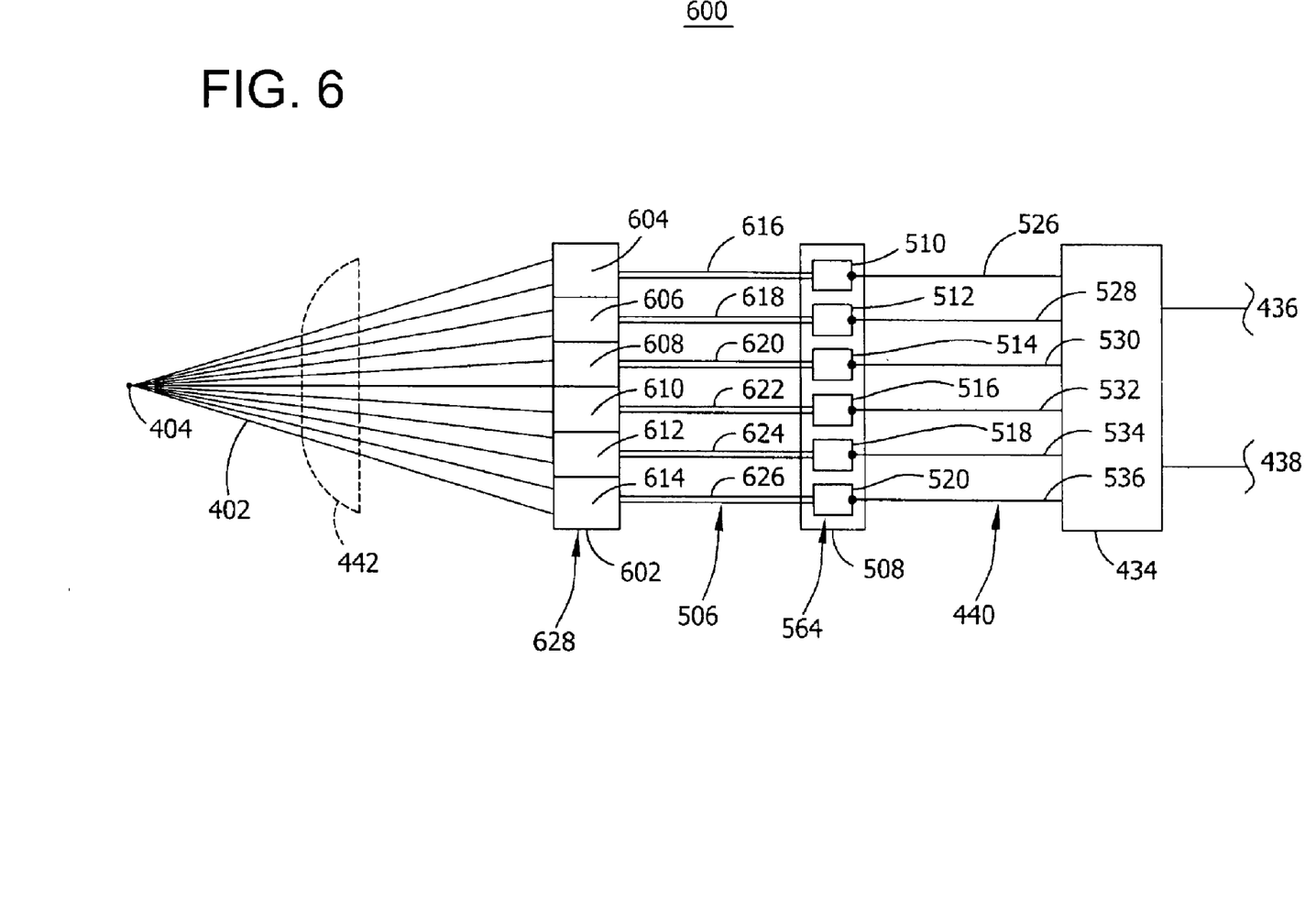
FIG. 6 is an illustration of a hot wheel or hot bearing temperature detection apparatus with an infrared filter bank according to one embodiment of the invention.

Referring now to FIG. 6, another embodiment of the invention is a wavelength range IR heat detection apparatus with an infrared filter bank 600. Emitted infrared (IR) radiation 402 has a point of origin or focal point 404. An IR filter bank 602 is positioned to receive the collected IR radiation 402. In an optional embodiment, a lens 442 collects the emitted radiation 402 and collects the radiation 402 for presentation to the filter bank 602. Filter bank 602 is composed of two or more filter elements 628 that pass wavelengths or frequencies of the collected IR radiation 402 within a particular wavelength range or frequency band. Each filter element 628 of filter bank 602 passes wavelength ranges 506. For example, each filter element 604 to 614 has an associated wavelength range 506, which is identified as 616 to 626.

In one embodiment as shown in FIG. 6, the filter bank 602 is comprised of six filter elements 628 as denoted as 604 to 614. Each filter element 628 of filter bank 602 passes a different and discrete wavelength range or frequency band. Each filter element 628 passes a wavelength range that does not substantially overlap with any wavelength range generated by any other filter element 628. For example, in one embodiment filter element 604 passes a wavelength range 616 that is represented as a wavelength from 5.0 to 6.5 microns or a frequency band of from $6.0 \times 10^{13}$ to $4.6 \times 10^{13}$ Hz. Filter element 606 passes a wavelength range 618 that is represented as a wavelength from 6.5 to 8.0 microns or a frequency band of from $4.6 \times 10^{13}$ to $3.7 \times 10^{13}$ to Hz. The remaining filter elements 608 to 614 of filter bank 602 each have similar wavelength ranges and frequency bands representing a 1.5-micron wavelength range. Of course, FIG. 6 is only illustrative of one embodiment of an IR detection array with six filter elements. In other embodiments the number of filter elements 564 may be any number equal to or greater than two and therefore the number of generated wavelength ranges 506 will be the corresponding number. Additionally, as is the case with other embodiments, the wavelength ranges for each filter element 628 may vary from less than one hundredth of a micron to several hundred microns.

The wavelength range IR detector with filter bank 600 further comprises an IR detection array 508 which was discussed above with regard to the embodiment illustrated in FIG. 5. As shown in FIG. 6 there is an array element 510 to 520 for each IR filter element 628 and therefore for each wavelength range 506. Each IR array element 510 to 520 detects the presence of infrared radiation of the corresponding IR wavelength range 506. Each IR array element 564 has an associated output signal 440 that provides output signals 526 to 540 that are indicative of the detected IR radiation of the corresponding IR array elements 510 to 524.

In another embodiment, the wavelength range IR detector with filter bank 600 also comprises a wavelength range heat detection processor 434 as shown in FIG. 6 and as discussed above with regard to FIG. 4 and FIG. 5. In this embodiment, the functions of processor 434 are similar or the same as discussed above in conjunction with the wavelength range IR heat detector apparatus 400 and the wavelength range IR heat detection apparatus with a prism 500. Additionally, processor 434 in this embodiment has the features, functions and embodiments for outputs as discussed above.

In each of the illustrated apparatus embodiments, the wavelength range IR heat detector apparatus 400, the wavelength range IR heat detection apparatus with a prism 500, and the wavelength range IR detector with filter bank 600, two or more wavelength ranges are detected by the invention and output signals 440 are indicative of the temperature range of the detected radiation. Of course, there may be other embodiments that are not explicitly disclosed herein that may also provide for the detection of two or more wavelength range IR components. Additionally, in the embodiments utilizing processor 434, other embodiments may provide additional analysis and determinations in order to determine the temperature range or the temperature of the wheel 104 or bearing 108.

Figure 9:
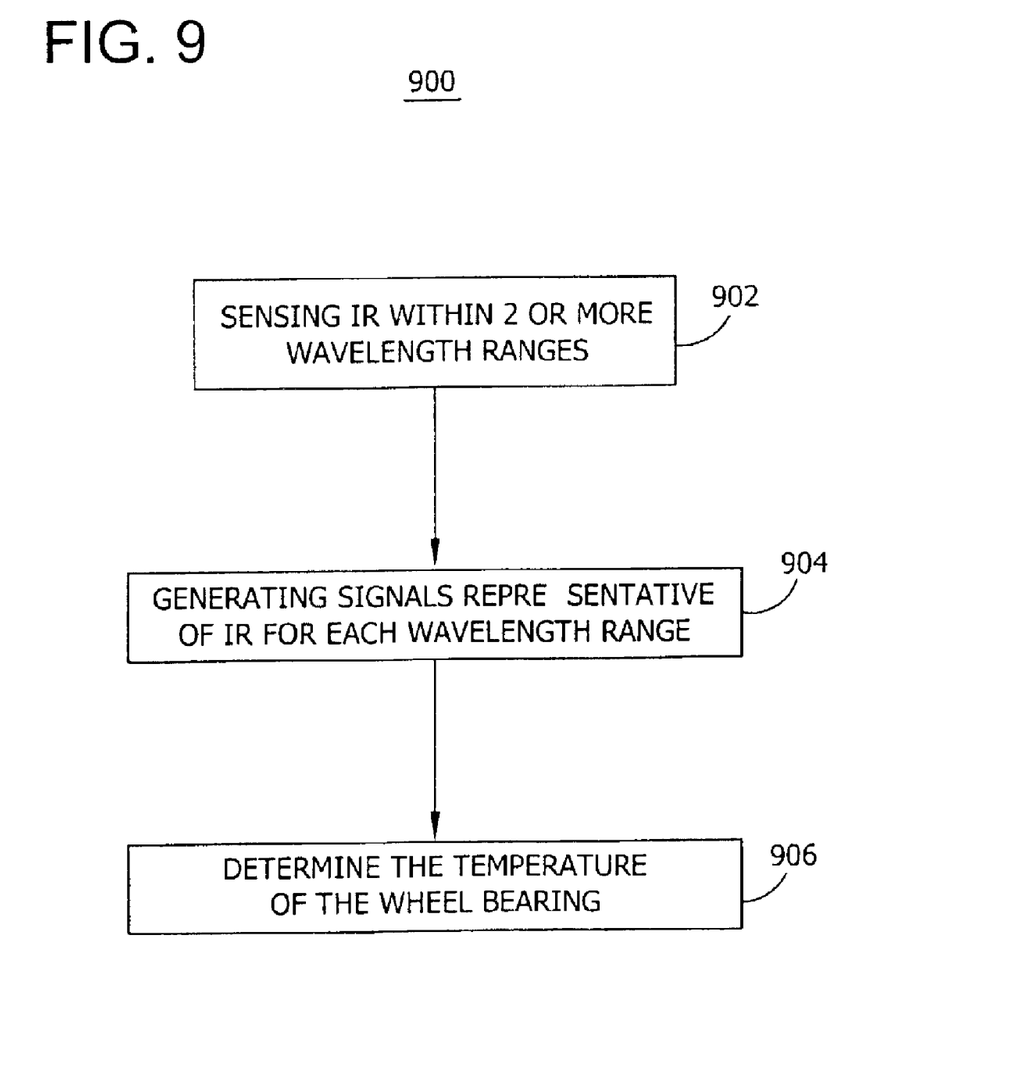
FIG. 9 is a logic flow chart for a method for detecting a temperature range of railroad train wheel or bearing according to one embodiment of the invention.
Figure 10:
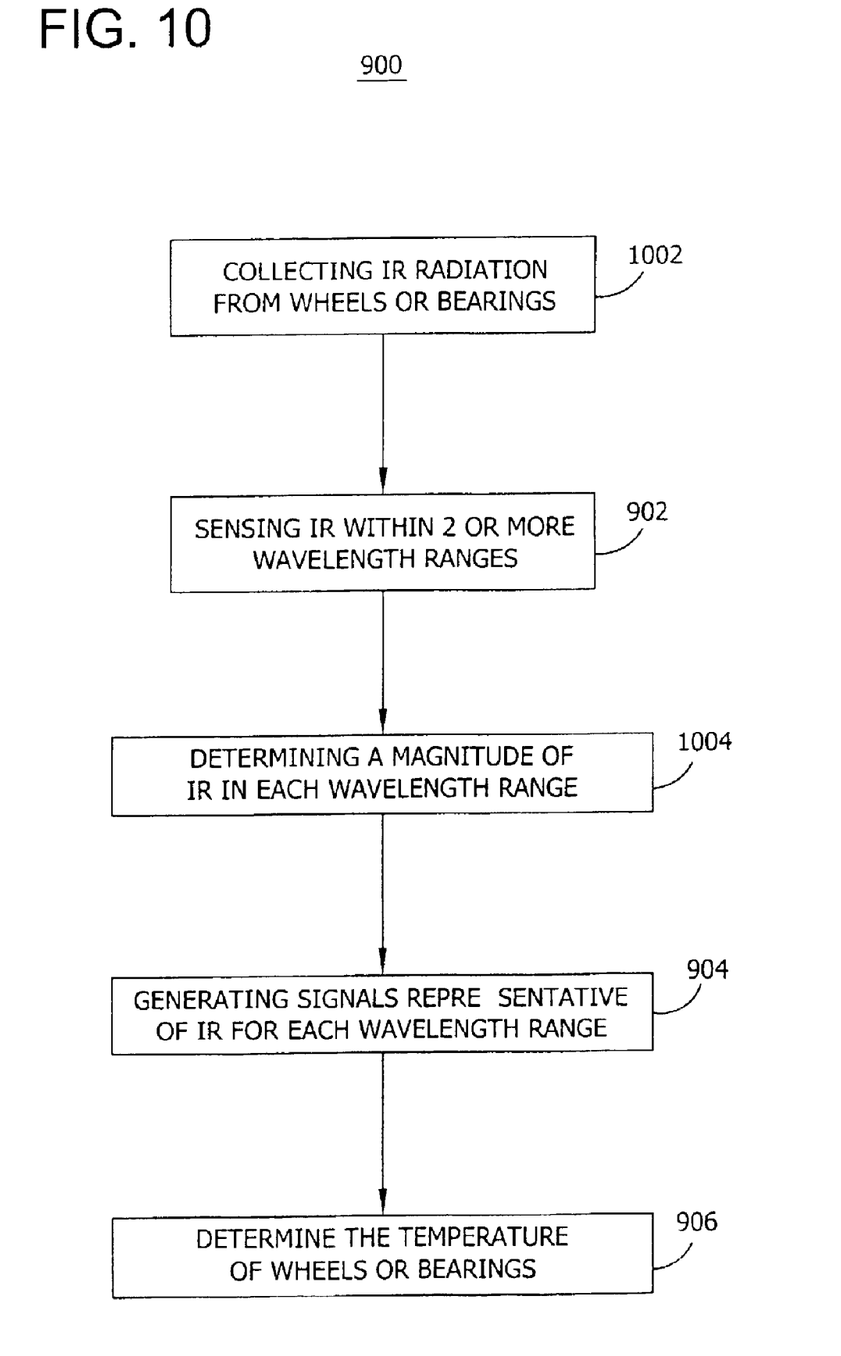
FIG. 10 is a logic flow chart for a method for detecting a temperature range of railroad train wheel or bearing according to one embodiment of the invention.
Figure 11:
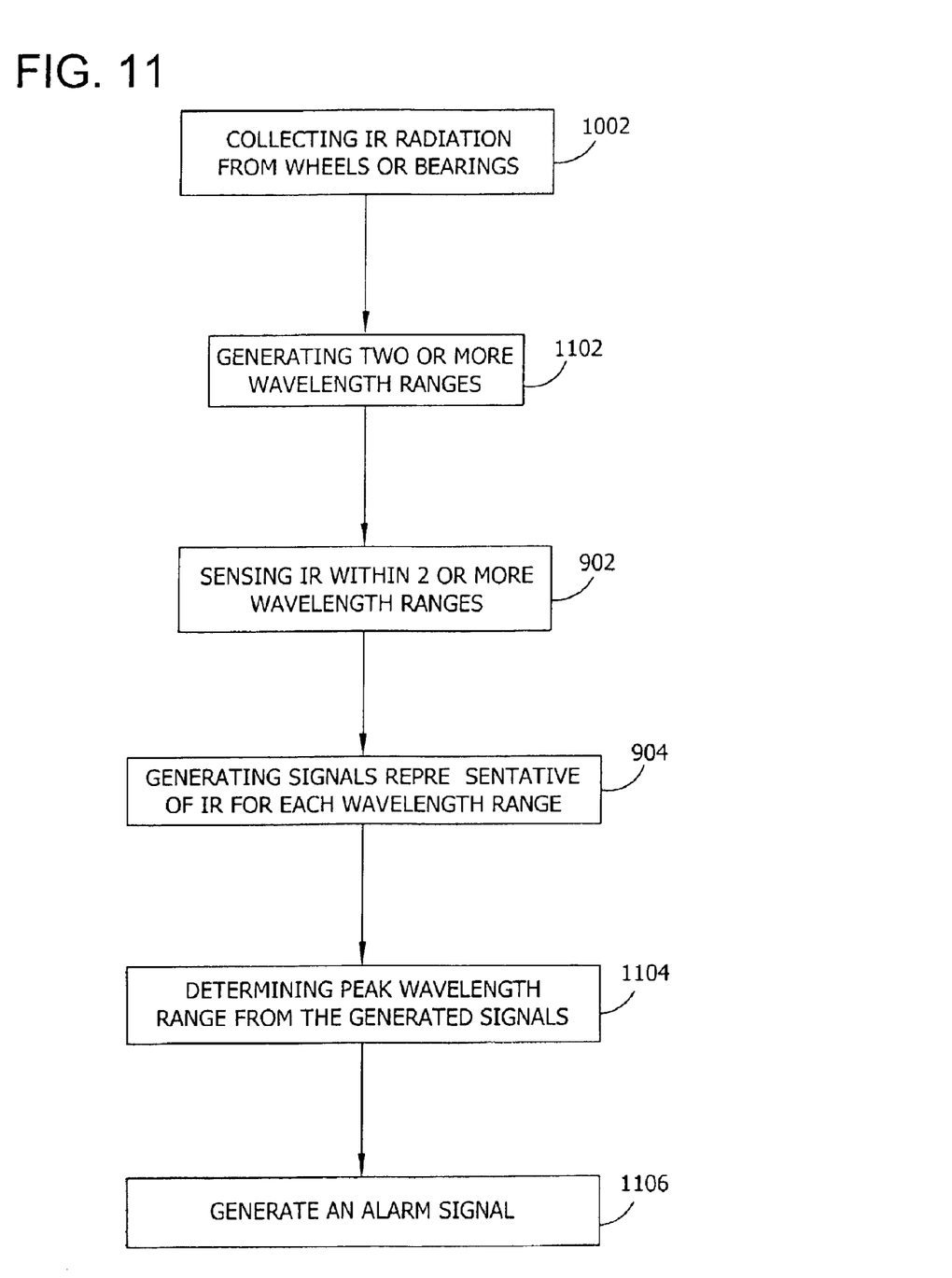
FIG. 11 is a logic flow chart for a method for detecting a temperature range of railroad train wheel or bearing according to one embodiment of the invention.

Other embodiments of the invention comprise methods (as illustrated in FIGS. 9, 10 and 11) for detecting a temperature range or a temperature of railroad train wheel 104 or bearing 108. Referring to FIG. 9 as one embodiment, the method comprises a method for detecting a temperature range of a railroad train wheel 104 or bearing 108 wherein infrared radiation radiating from the wheel 104 or bearing 108 of a train traversing a railroad track is indicative of the temperature range of the wheel 104 or bearing 108. The method comprises sensing in 902 infrared radiation radiating from the wheel 104 or bearing 108 within two or more wavelength ranges of the infrared radiation. Signals 440 are generated in 904 that are indicative of the sensed infrared radiation in each infrared wavelength range. The method also comprises in 906 determining the temperature range or the temperature of the wheel 104 or bearing 108 from the generated signals 440.

In another embodiment, as illustrated in FIG. 10, the method includes in 1002 collecting the IR radiation form the wheel 102 or bearing 108. The IR radiation within 2 or more wavelength ranges is sensed in 902. A magnitude of the IR radiation in each wavelength range is determined in 1004. Signals 404 are generated in 904 that are indicative of the IR in each wavelength range. The temperature range or the temperature of the wheel 104 or bearing 108 is determined in 906.

Referring now to FIG. 11, in another embodiment the invention comprises a method in 1002 of collecting infrared radiation radiating from the wheel or bearing of a train traversing a railroad track. In 1102, two or more wavelength ranges are generated. The IR radiation within two or more wavelength ranges is sensed in 902. Signals are generated in 904 that are indicative of the IR radiation in each wavelength range. The peak wavelength range is determined from the generated signals in 1104 and an alarm is generated in 1106 when the peak wavelength range is less than or equal to a predefined threshold wavelength range or wavelength.

In an alternative embodiment, the method includes filtering the collected infrared radiation into two or more wavelength ranges, wherein each filtered wavelength range does not substantially overlap with any other filtered wavelength range. In such an embodiment, the sensing step senses the infrared radiation within each of the filtered wavelength ranges.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

While various embodiments of the present invention have been illustrated and described, it will be appreciated to those skilled in the art that many changes and modifications may be made thereunto without departing from the spirit and scope of the invention. As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for detecting a temperature range of a railroad train wheel or bearing wherein infrared radiation radiating from the wheel or bearing of a train traversing a railroad track is indicative of a temperature range of the wheel or bearing, the apparatus comprising:
   a sensor for sensing infrared radiation radiating from the wheel or bearing within two or more different infrared wavelength ranges and generating signals indicative of an amplitude of the sensed infrared radiation in each of the wavelength ranges; and
   a processor determining a peak wavelength range having the greater amplitude as a function of each of the generated signals during a particular period of time, wherein the determined peak wavelength range is indicative of a temperature range of the wheel or bearing.

2. The apparatus of claim 1 wherein the generated signals have an amplitude indicative of the amplitude of the sensed infrared radiation and wherein the processor determines the peak wavelength range from the wavelength ranges as represented by the generated signals by identifying the generated signal having a greater amplitude.

3. The apparatus of claim 1, wherein the processor generates a signal indicative of the temperature range of the wheel or bearing and wherein the processor generates an alarm signal for activating an alarm when the determined temperature range is treater than a predetermined temperature.

4. The apparatus of claim 1, wherein the processor generates a signal indicative of the temperature range of the wheel or bearing and wherein the processor generates an alarm signal when the determined peak wavelength range is less than or equal to a predetermined wavelength.

5. The apparatus of claim 1, wherein the sensor further comprises two or more sensing elements, each sensing element sensing a wavelength range which does not substantially overlap with any wavelength range sensed by the any other sensing element and wherein each sensing element provides a signal indicative of a magnitude of the infrared radiation sensed in its corresponding wavelength range.

6. The apparatus of claim 1, further comprising:
   a lens collecting infrared radiation radiating from the wheel or bearing from a train traversing a railroad track;
   wherein the sensor receives the collected infrared radiation.

7. The apparatus of claim 1, further comprising:
   a lens collecting infrared radiation radiating from the wheel or bearing from a train traversing a railroad track and producing corresponding coherent infrared radiation; and
   a prism receiving the coherent infrared radiation from the lens and generating a spectrum of infrared radiation along an axis;
   wherein the sensor is an array of sensing elements aligned along the axis to receive the spectrum of infrared radiation.

8. The apparatus of claim 1, further comprising:
   a filter bank comprising two or more filters positioned to receive infrared radiation emitted by the wheel or bearing, each filter passing a wavelength range which does not substantially overlap with any wavelength range transmitted by any other filter;

wherein the sensor is an array of sensing elements, each element receiving the infrared radiation passed by one of the filters.

9. The apparatus of claim 8, further comprising:
a lens collecting infrared radiation radiating from the wheel or bearing from a train traversing a railroad track;
wherein the filter bank receives the collected infrared radiation from the lens.

10. The apparatus of claim 1, wherein the sensor is configured to sense the wavelength ranges of radiation within the wavelength range from 800 nanometers to 30 microns.

11. The apparatus of claim 1, wherein the sensor is an infrared array.

12. An apparatus for detecting a temperature range of a railroad train wheel or bearing wherein infrared radiation radiating from the wheel or bearing of a train traversing a railroad track is indicative of a temperature range of the wheel or bearing, the apparatus comprises:
a lens collecting infrared radiation radiating from the wheel or bearing of a train traversing a railroad track and producing coherent radiation corresponding to the collected infrared radiation;
a prism receiving the coherent infrared radiation from the lens and generating a spectrum of infrared radiation along an axis;
a sensor receiving the spectrum, sensing infrared radiation within two or more different infrared wavelength ranges, and generating signals indicative of an amplitude of the radiation within each of the infrared wavelength ranges; and
a processor receiving the generated signals indicative of the infrared radiation within each of the wavelength ranges and determining a peak wavelength range as a function of each of the generated signals, wherein the peak wavelength range is indicative of the temperature range of the wheel or bearing.

13. The apparatus of claim 12, wherein the generated signals have an amplitude indicative of the amplitude of the sensed infrared radiation and wherein the processor determines the peak wavelength range from the wavelength ranges as represented by the generated signals by identifying the generated signal having a greater amplitude.

14. The apparatus of claim 13, wherein the sensor is an array of sensing elements aligned along the axis to receive the spectrum of infrared radiation.

15. The apparatus of claim 12, wherein the processor generates a signal indicative of the determined temperature range and generates an alarm signal for activating an alarm when the determined temperature range is greater than a predetermined temperature.

16. An apparatus for detecting a temperature range of a railroad train wheel or bearing wherein infrared radiation radiating from the wheel or bearing of a train traversing a railroad track is indicative of a temperature range of the wheel or bearing, the apparatus comprising:
a lens collecting infrared radiation radiating from the wheel or bearing of a train traversing a railroad track and producing coherent infrared radiation corresponding to the collected radiation;
a prism receiving the coherent infrared radiation from the lens and generating a spectrum of infrared radiation along an axis;
an array of sensing elements aligned along the axis receiving the spectrum of infrared radiation, sensing infrared radiation within two or more different infrared wavelength ranges, and generating corresponding signals having a magnitude indicative of an amplitude of the sensed infrared radiation within each of the two or more infrared wavelength ranges; and
a processor or circuit receiving the generated signals of the infrared radiation within each of the two or more wavelength ranges, determining a peak wavelength range having the greater amplitude as a function of the generated signals, said peak wavelength range being indicative of the temperature range of the wheel or bearing, and generating a signal indicative of the temperature range.

17. The apparatus of claim 16, wherein the processor or circuit determines the temperature range of the wheel or bearing by determining a peak wavelength range having the greater amplitude of the sensed infrared radiation as a function of the generated signals.

18. An apparatus for detecting a temperature range of a railroad train wheel or bearing wherein infrared radiation radiating from the wheel or bearing of a train traversing a railroad track is indicative of a temperature range of the wheel or bearing, the apparatus comprising:
a lens collecting infrared radiation radiating from the wheel or bearing of a train traversing a railroad track and producing coherent infrared radiation corresponding to the collected infrared radiation;
a sensor receiving the collected radiation, sensing the received infrared radiation within two or more different infrared wavelength ranges, and generating signals having an amplitude indicative of the radiation within the wavelength ranges; and
a processor or circuit receiving the generated signals indicative of the radiation within the infrared wavelength ranges, determining a peak wavelength range having the greater amplitude as a function of each of the generated signals, wherein the determined peak wavelength range corresponds to the generated signal having the greater amplitude and is indicative of a temperature range of the wheel or bearing, and generating a signal that is indicative of the temperature range of the wheel or bearing.

19. The apparatus of claim 18, wherein the processor or circuit generates an alarm signal when the peak wavelength range is equal to or less than a predefined wavelength representing a threshold temperature range.

20. The apparatus of claim 18, wherein the sensor is an infrared array.

21. An apparatus for detecting a temperature range of a railroad train wheel or bearing wherein infrared radiation radiating from the wheel or bearing of a train traversing a railroad track is indicative of a temperature range of the wheel or bearing, the apparatus comprising:
means for collecting infrared radiation radiating from the wheel or bearing of a train traversing a railroad track;
means for sensing an amplitude of infrared radiation of the collected infrared radiation within two or more different infrared wavelength ranges;
means for determining a peak wavelength range as a function of the amplitude of the sensed infrared radiation and wherein the determined peak wavelength range has the greater amplitude and is indicative of a temperature range of the wheel or bearing; and
means for generating a signal indicative of the temperature range of wheel or bearing as represented by the determined peak wavelength range.

22. The apparatus of claim 21, further comprising:
means for generating wavelength ranges of the collected infrared radiation, each of which does not substantially overlap with any other wavelength range;

wherein the means for sensing senses the wavelength ranges of the generating means.

23. The apparatus of claim 21, further comprising:
means for filtering the collected infrared radiation into two or more wavelength ranges, each wavelength range does not substantially overlap with any other filtered wavelength range; wherein each of the sensing means senses a corresponding filtered wavelength range.

24. The apparatus of claim 21, wherein the sensing means is an infrared array.

25. A method for detecting a temperature range of a railroad train wheel or bearing wherein infrared radiation radiating from the wheel or bearing of a train traversing a railroad track is indicative of a temperature range of the wheel or bearing, the method comprising the steps of
sensing infrared radiation radiating from the wheel or bearing within two or more wavelength ranges of the infrared radiation;
generating signals indicative of an amplitude of the sensed infrared radiation in each infrared wavelength range; and
determining a peak wavelength range having the greater amplitude as a function of each of the generated signals, wherein the peak wavelength range is indicative of a temperature range of the wheel or bearing.

26. The method of claim 25, further comprising:
generating the wavelength ranges of the infrared radiation wherein each wavelength range does not substantially overlap with any other generated wavelength range;
wherein sensing senses the infrared radiation in each of the generated wavelength ranges.

27. The method of claim 25, wherein the generated signals have an amplitude indicative of the amplitude of the sensed infrared radiation and wherein determining the temperature range comprises determining the peak wavelength range of the sensed infrared radiation by determined which of the generated signals has a greater amplitude relative to each of the other generated signals; and
wherein the determined peak wavelength range is indicative of the temperature range of the wheel or bearing.

28. The method of claim 25, wherein determining the temperature range comprises determining a temperature that is indicative of a temperature of the wheel or bearing.

29. The method of claim 28, wherein determining the temperature comprises determining a peak wavelength of the sensed infrared radiation; wherein the determined peak wavelength is indicative of the temperature of the wheel or bearing.

30. A method for detecting a temperature range of a railroad train wheel or bearing wherein infrared radiation radiating from the wheel or bearing of a train traversing a railroad track is indicative of a temperature range of the wheel or bearing, the method comprising the steps of:
collecting infrared radiation radiating from the wheel or bearing of a train traversing a railroad track;
sensing the collected infrared radiation within two or more wavelength ranges, wherein each wavelength range does not substantially overlap with any other wavelength range;
determining a magnitude of the infrared radiation in each of the sensed wavelength ranges;
generating signals indicative of the determined magnitudes; and
determining a peak wavelength range having a greater magnitude as a function of each of the generated signals, wherein the peak wavelength range is indicative a temperature range of the wheel or bearing.

31. The method of claim 30, further comprising;
generating two or more wavelength ranges of the collected infrared radiation, wherein each generated wavelength range does not substantially overlap with any other generated wavelength range;
wherein sensing is sensing the infrared radiation within the each of the generated wavelength ranges.

32. The method of claim 30, further comprising:
filtering the collected infrared radiation into two or more wavelength ranges, wherein each filtered wavelength range does not substantially overlap with any other filtered wavelength range;
wherein sensing senses the infrared radiation within each of the filtered wavelength ranges.

33. The method of claim 30, wherein determining the temperature range comprises the substep of determining a peak wavelength range of the sensed infrared radiation within each wavelength range; and
wherein the determined peak wavelength range is indicative of the temperature range of the wheel or bearing.

34. A method for detecting a temperature range of railroad train wheel or beating wherein infrared radiation radiating from the wheel or bearing of a train traversing a railroad track is indicative of a temperature range of the wheel or bearing, the method comprising the steps of:
collecting infrared radiation radiating from the wheel or bearing of a train traversing a railroad track;
generating two or more different wavelength ranges of the collected infrared radiation, wherein each generated wavelength range does not substantially overlap with any other generated wavelength range;
sensing infrared radiation within each of the infrared wavelength ranges;
generating a corresponding signal having an amplitude indicative of an amplitude of the sensed infrared radiation for each wavelength range;
determining a peak wavelength range from the amplitude of each of the generated signals, wherein the peak wavelength range is indicative of a temperature range of the wheel or bearing; and
generating an alarm signal when the determined peak wavelength range is less than or equal to a predefined wavelength.

35. An apparatus for detecting a temperature of a railroad train wheel or bearing wherein infrared radiation radiating from the wheel or bearing of a train traversing a railroad track is indicative of a temperature of the wheel or bearing, the apparatus comprising:
a sensor for sensing infrared radiation radiating from the wheel or bearing within two or more different infrared wavelength ranges and generating signals having a magnitude indicative of the amplitude of the sensed infrared radiation in each of the wavelength ranges; and
a processor determining a peak wavelength range having the greater amplitude as a function of the generated signals by analyzing each of the generated signals to determine which of the generated signals has the greater magnitude relative to the other generated signals during a particular time period, and wherein said peak wavelength range is indicative of a temperature of the wheel or bearing.

* * * * *